United States Patent
Arning et al.

(10) Patent No.: US 10,257,303 B2
(45) Date of Patent: Apr. 9, 2019

(54) PROXY-COMPUTER-BASED PROVISION OF ALTERNATIVE GRAPHICAL USER INTERFACES

(71) Applicant: INTERNATIONAL BUSINESS MACHINES CORPORATION, Armonk, NY (US)

(72) Inventors: Andreas Arning, Boeblingen (DE); Jens Engelke, Boeblingen (DE); Klaus Rindtorff, Boeblingen (DE); Thomas Stober, Boeblingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 213 days.

(21) Appl. No.: 15/086,223

(22) Filed: Mar. 31, 2016

(65) Prior Publication Data
US 2017/0289292 A1  Oct. 5, 2017

(51) Int. Cl.
| | |
|---|---|
| G06F 9/44 | (2018.01) |
| G06F 3/048 | (2013.01) |
| H04L 29/08 | (2006.01) |
| H04L 29/06 | (2006.01) |
| G06F 9/451 | (2018.01) |
| G06F 17/30 | (2006.01) |

(52) U.S. Cl.
CPC .......... *H04L 67/2823* (2013.01); *G06F 9/451* (2018.02); *G06F 17/30899* (2013.01); *H04L 67/42* (2013.01)

(58) Field of Classification Search
CPC ........ G06F 3/048; G06F 9/4443; G06F 9/451; G06F 17/30899; H04L 67/2823
See application file for complete search history.

(56) References Cited

U.S. PATENT DOCUMENTS

| | | | |
|---|---|---|---|
| 6,260,015 B1 | 7/2001 | Wang et al. | |
| 7,003,729 B1 | 2/2006 | Rajala et al. | |
| 8,375,295 B2 * | 2/2013 | Zalewski | G06F 1/1626 345/173 |
| 8,452,720 B2 | 5/2013 | Zhou et al. | |
| 8,533,604 B1 * | 9/2013 | Parenti | G06F 9/451 715/743 |

(Continued)

*Primary Examiner* — Mahelet Shiberou
(74) *Attorney, Agent, or Firm* — Cantor Colburn LLP; Richard Wilhelm

(57) ABSTRACT

The invention relates to a computer-implemented method for providing an alternative GUI to a client application. A proxy computer comprises a history with request sequences respectively representing a part of a workflow predefined by an original GUI. Each request sequence in the history has been transmitted previously from an original GUI displayed in a client application via the proxy computer and via a network to a backend application. The proxy computer intercepts a current request transmitted from the original GUI to the backend application via the network and the proxy computer, compares the current intercepted request with the request sequences in the history, identifies and evaluates a matching request sequence for generating the alternative GUI, the alternative GUI completely or partially implementing the part of the workflow represented by the identified request sequence and returns the generated alternative GUI via the network to the client application.

13 Claims, 4 Drawing Sheets

(56) References Cited

U.S. PATENT DOCUMENTS

| | | | |
|---|---|---|---|
| 9,015,660 B1* | 4/2015 | Webb | G06F 3/048 |
| | | | 709/224 |
| 9,046,917 B2 | 6/2015 | Senanayake et al. | |
| 9,424,398 B1* | 8/2016 | McLeod | G06F 19/366 |
| 2005/0149206 A1* | 7/2005 | Krane | G06F 9/451 |
| | | | 700/17 |
| 2005/0172075 A1 | 8/2005 | Marcus | |
| 2011/0271219 A1* | 11/2011 | Krishnan | G16H 40/40 |
| | | | 715/771 |
| 2012/0331423 A1* | 12/2012 | Kumamoto | G06F 3/0482 |
| | | | 715/853 |
| 2014/0075371 A1 | 3/2014 | Carmi | |

* cited by examiner

PROXY-COMPUTER-BASED PROVISION OF ALTERNATIVE GRAPHICAL USER INTERFACES

BACKGROUND

The present invention relates to graphical user interfaces (GUIs), and more particularly to the automated provision of alternative GUIs for a given GUI of an application.

Mobile devices have limited resources in terms of processing power, memory, storage, network bandwidth and energy supply compared to conventional desktop computer systems. The following operations associated with using client applications on a mobile device are therefore in general considered as problematic: a) rich, complex, "heavy-weight" GUIs comprising lots of graphical elements and/or code as such GUIs require considerable network, memory and CPU resources for being instantiated and/or for being provided via a network to the client device; b) frequent client-server roundtrips; c) GUIs requiring a large screen space as they are considered as inconvenient to use on a small screen as they force a user to extensively scroll over the screen for getting a complete overview of the displayed data content and/or of the data entry fields that must be filled, whereby the scrolling movement consumes time and additional battery power.

On the other hand, heavy-weight GUIs often provide valuable graphical elements or functions that accelerate the task a user wants to perform with the GUI provided this GUI is presented on a large screen of a standard computer, e.g. an LCT screen connected to a standard desktop computer.

In a further aspect, many legacy applications solely comprise a single, heavyweight "legacy" or "original" GUI. Manually developing an additional, lightweight GUI that provides the same functionality is time consuming and expensive and is therefore rarely an option, in particular for companies that use a large number of legacy applications. Nevertheless, as a growing number of employees use smartphones and tablet computers for performing their working obligations, there is a need for enabling the employees to use the legacy applications also via their mobile devices within or outside of a company's premises.

SUMMARY

In one aspect, the invention relates to a computer-implemented method for providing an alternative GUI to a client application, the method comprising: providing a proxy computer, the proxy computer comprising a history with one or more request sequences, each request sequence being a sequence of consecutive requests having been transmitted previously from an original GUI displayed by the aforementioned client application or by another client application via the proxy computer and via a network to a backend application, each request sequence representing a part of a workflow predefined by the original GUI; intercepting, by the proxy computer, one or more current requests transmitted from the original GUI displayed by the client application to the backend application via the network and the proxy computer; comparing, by the proxy computer, the one or more current intercepted requests with the request sequences in the history for identifying a request sequence that matches at least partially with the one or more current intercepted requests; evaluating, by the proxy computer, the identified request sequence for generating the alternative GUI, the alternative GUI completely or partially implementing the part of the workflow represented by the identified request sequence; and returning, by the proxy computer, the generated alternative GUI via the network to the client application for enabling the user to perform the parts of the workflow represented by the alternative GUI via the alternative GUI instead of the original GUI.

In a further aspect, the invention relates to a computer program product for providing an alternative GUI to a client application, the computer program product comprising a computer readable storage medium having program instructions embodied therewith, the program instructions executable by a processor to cause the processor to execute a method comprising: providing a proxy computer, the proxy computer comprising a history with one or more request sequences, each request sequence being a sequence of consecutive requests having been transmitted previously from an original GUI displayed by the aforementioned client application or by another client application via the proxy computer and via a network to a backend application, each request sequence representing a part of a workflow predefined by the original GUI; intercepting, by the proxy computer, one or more current requests transmitted from the original GUI displayed by the client application to the backend application via the network and the proxy computer; comparing, by the proxy computer, the one or more current intercepted requests with the request sequences in the history for identifying a request sequence that matches at least partially with the one or more current intercepted requests; evaluating, by the proxy computer, the identified request sequence for generating the alternative GUI, the alternative GUI completely or partially implementing the part of the workflow represented by the identified request sequence; and returning, by the proxy computer, the generated alternative GUI via the network to the client application for enabling the user to perform the parts of the workflow represented by the alternative GUI via the alternative GUI instead of the original GUI.

In a further aspect, the invention relates to a proxy computer comprising one or more processors and a network interface for connecting the proxy computer with a client application via a network; a storage medium comprising a history with one or more request sequences, each request sequence being a sequence of consecutive requests having been transmitted previously from an original GUI displayed by the aforementioned client application or by another client application via the proxy computer and via the network to a backend application, each request sequence representing a part of a workflow predefined by the original GUI.

BRIEF DESCRIPTION OF THE DRAWINGS

In the following, embodiments of the invention are explained in greater detail, by way of example only, making reference to the drawings in which.

DETAILED DESCRIPTION

Figure 1:
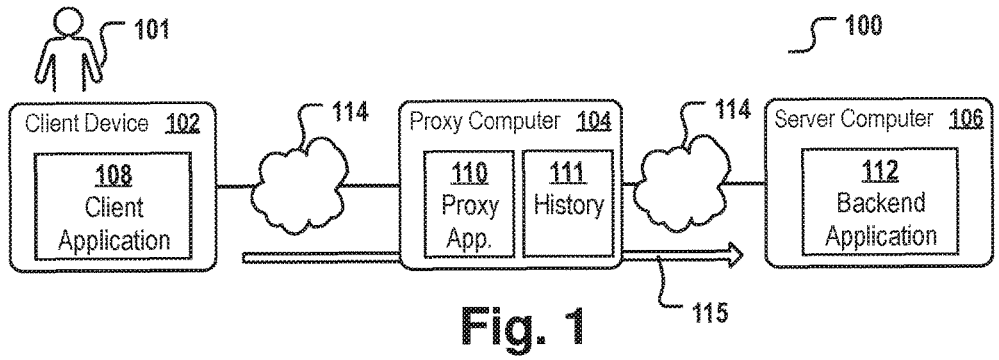
FIG. 1 depicts a distributed computer system comprising a proxy computer.

Embodiments of the invention may have the advantage that a given GUI-based functionality of a piece of program logic, e.g. a part of a workflow of an application program, can be provided to a user via the network in the form of an alternative GUI without having to manually implement said alternative GUI. As the alternative GUI is computed automatically by the proxy computer and is provided dynamically based on history data that is automatically evaluated, it is not necessary that a programmer checks the source code of the original GUI provided e.g. by a legacy backend application and implements an alternative, typically more lightweight version. Thus, for one or more legacy applications whose original GUI could formerly only be used conveniently on a large screen can now also be used on a small screen of a client device without necessitating the manual implementation of the GUI.

Moreover, computational resources may be saved on the client side as less GUI elements may have to be instantiated and/or less scrolling movements have to be computed and rendered for instantiating and displaying the alternative GUI than the original GUI. In addition, the alternative GUI may have a smaller-sized layout and/or use a more condensed arrangement of data entry fields, thereby reducing the necessity to perform a scrolling movement and enabling a user to finish a data entry tasks more quickly.

For example, the alternative GUI may be a more lightweight version of the original GUI and/or may comprise a fewer number of graphical elements, GUI elements, script-based widgets, etc. In some embodiments, the alternative GUI is a GUI that is specially adapted for display on a small screen, e.g. comprises a different HTML- or CSS-based layout and/or comprises a set of data entry fields in a single page are that were spread over a plurality of different pages and/or was spread over a larger GUI page area in the original GUI. This may reduce the consumption of network traffic as a more lightweight GUI may be transferred via a network in case the client application is a network-based application.

The expression "original GUI displayed by a client application" as used herein refers to the runtime objects instantiated and/or rendered by a processor of a client device.

According to some embodiments, the specification of the layout and/or functionality of the original GUI may be provided in a previous step by the backend application and transferred to the client application via a network. For example, the backend application may specify the original GUI by means of an HTML5 markup language or by a special-purpose, non-standard markup language and generate a document comprising said HTML5 or non-standard markup language document. The backend server may provide said markup document to the client application via the network and the client application uses the markup document for instantiating and/or rendering the original GUI by the client application.

For example, the client application can be a standard browser such as Firefox and may instantiate the original GUI by rendering the HTML5 document received from the backend application in response to a user entering the backend server URL in the address field of the browser. A standard browser is a client program that uses HTTP (Hypertext Transfer Protocol) to make requests of Web servers throughout the Internet on behalf of the browser user. Most browsers support e-mail and the File Transfer Protocol (FTP) but a Web browser is not required for those Internet protocols and more specialized client programs are more popular. Known standard browsers are, for example, Netscape Navigator, Internet Explorer (IE), Firefox, Flock, Safari, Lynx, Opera, Chrome and many others. Preferentially, a standard browser is capable of interpreting HTML5 markup language documents.

According to other examples, the client application is a special-purpose browser configured to instantiate the original GUI by rendering a special-purpose, non-standard markup language document provided by the backend application. Said document can be provided by the backend application in response to a user entering the backend server URL in the address field of the special-purpose browser. A special-purpose browser is capable of interpreting, at least, a basic set of HTML markup expressions, but may not be able to interpret all expressions specified in the HTML5 protocol and/or may be configured to interpret non-standard markup expressions generated by the backend application.

According to other embodiments, the client application is an application running on a client device which is not capable of interpreting HTML markup. The original GUI is provided upon instantiation of the client application and is implemented in the form of computer-interpretable instructions which are part of the client application. For example, said instructions and instructions of the business logic of the client application may be stored on a non-volatile storage medium of the client device. Alternatively, instructions for instantiating the original GUI are provided in a non-HTML syntax, possibly as executable code, by the backend server to the client application.

Irrespective of whether the client application is a standard-browser, a special-purpose-browser or an app, is interoperable with the backend application at least in so far as the data entered by a user in the original GUI instantiated on the client side is transferred to the backend application in a format that can be interpreted and processed by the backend application.

According to embodiments, the proxy computer is configured to process each intercepted request received from the original and/or from the alternative GUI displayed in the client application such the backend application is prohibited from determining if the proxy intercepts the data exchange between backend application and client application. For example, the proxy computer may extract user-provided parameter values from intercepted requests and forward the extracted parameter values to the backend application in the same way as the original GUI would have provided said parameter values to the backend application.

According to embodiments, the original GUI is implemented such that parameters and respective parameter values entered by a user in the original GUI are specified in the request in a format that can be easily parsed by the proxy computer. For example, parameter values can be passed via an HTTP GET or POST request. It is possible that the client application and the backend application exchange requests based on a different protocol, but in this case, the proxy computer has to be configured such that it is capable of extracting the parameters and parameter values from said different protocol. The client application may be interoperable with the backend-application and interactively provide for a particular functionality, e.g. course enrollment, staff management, IT resource management, etc.

According to other embodiments, the client application is an application running on a client device, e.g. a so called "App" running on a mobile client device. An "App" as used herein is a computer program designed to run on mobile devices such as smartphones and tablet computers. For example, the standard browser, or the special-purpose browser or the application.

According to embodiments, the client application is a standard browser or special-purpose browser running on a client device. The backend application transmits a specification of the layout and function of the original GUI to the client application via the network. The client application instantiates and/or renders the original GUI in accordance with the transmitted specification for displaying the original GUI on a screen of a client device.

The one or more processors are configured for intercepting, by the proxy computer, one or more current requests transmitted from the original GUI displayed by the client application to the backend application via the network and the proxy computer; comparing the one or more current intercepted requests with the request sequences in the history for identifying a request sequence that matches at least partially with the one or more current intercepted requests; evaluating the identified request sequence for generating the alternative GUI, the alternative GUI completely or partially implementing the part of the workflow represented by the identified request sequence; and returning the generated alternative GUI via the network to the client application for enabling the user to perform the parts of the workflow represented by the alternative GUI via the alternative GUI instead of the original GUI.

According to embodiments, the generation of the alternative GUI that completely or partially implements the part of the workflow represented by the identified request comprises: identifying, by the proxy computer, a plurality of request sequences stored in the history and covering the part of the workflow, each of the identified request sequences corresponding to a sequence of requests transmitted by a user via the original GUI from the aforementioned client application or the other client application to the backend application previously, each of the plurality of identified request sequences comprising, for each request, one or more parameter values provided by the user or by the original GUI per default for submission to the backend application; identifying, by the proxy computer, for each of the parameters in each of the requests of the identified plurality of request sequences, if the parameter is an invariable parameter or a variable parameter, an invariable parameter being a parameter whose value is identical for the request in each of the plurality of identified request sequences, a variable parameter being a parameter of a request whose value differs for the request in two or more of the plurality of identified request sequences; and performing the generation of the alternative GUI by generating a GUI that selectively comprises data entry fields for the variable parameters and that lacks data entry fields for the invariable parameters.

Using a standard or special purpose browser which is capable of interpreting, at least, some HTML markup language expressions may be advantageous as the original GUI can easily be created by the proxy computer in the form of an HTML page, provided to the client computer. The original GUI may be displayed in a frame of a framed HTML page whose frames are generated by the proxy computer. The alternative GUI may also be created by the proxy computer in the form of an HTML page that is displayed in a separate frame in the browser running on the client device. For example, the browser may display an HTML page comprising a first HTML frame and a second HTML frame. The first frame may comprise the original GUI displayed by the client application (that may have been received from the backend application via the network e.g. upon launching the client application). The second frame may comprise one or more selectable GUI elements for enabling the user to interact with the proxy computer and control some actions performed by the proxy computer. The alternative GUI may be displayed in a third frame of the HTML page of the browser or may replace the original GUI in the first frame. In some embodiments, one of the selectable GUI elements may allow the user of the client device to switch between the original and the alternative GUI.

According to embodiments, the client application is an application running on a client device. One or more processors of the client device read computer-interpretable instructions which are part of the client application from a storage device of the client device. Then, the processor(s) instantiate the original GUI by executing the read instructions.

According to embodiments, the method comprises the proxy computer generating the history. The generation of the history comprises monitoring, by the proxy computer, if a start signal and/or an end signal are received while a user interacts with the original GUI displayed by the client application; and recording, by the proxy computer, each sequence of requests consecutively received from the original GUI displayed by the client application that is delimited by a start signal and a completion signal and storing the recorded request sequence in the history. The history may comprise a plurality of request sequences submitted by the same user via different client devices and different client applications (e.g. standard browsers of different types and optionally adapted to different device types, e.g. mobile or desktop systems).

This may be advantageous as a manual analysis of the workflow implemented in the original GUI is not necessary. This may not even be possible due to the complexity of the original GUI that may allow a user to follow a plurality of different pathways/user-specific workflows. The workflow is simply recorded as the user interacts with the original GUI for entering data into respective data entry fields and widgets. Thus, a highly flexible, adaptable and at the same time fully automated way of creating an alternative GUI may be provided. User data may be, for example, text keyed in via a keyboard or a touchscreen-based key field and entered e.g. into a text field or text area. In addition, or alternatively, the entered user data may consist of a selection of one of a plurality of presented menu items, option list elements, checkbox elements, radio button group elements, may consist of biometric data, voice data, image data or the like.

According to embodiments, the start signal and the completion signal are signals triggered by a user interacting with a user interface element. The proxy computer provides the user interface element via a network to a client device hosting the client application. The user interface element can be, for example, a button, e.g. an HTML button. The user interface element, also referred to as "GUI element", is generated by the proxy computer, transferred via the network to the client device and displayed in a separate frame in the browser of the client device.

According to alternative embodiments, the start signal is the first request received by the proxy computer after initialization of the client application or after a previous completion signal was received by the proxy computer. The completion signal is a timeout signal after a predefined time interval lapsed since the start signal was received. For example, the time interval can be in the range of some minutes, e.g. 2 minutes, 5 minutes, 10 minutes or the like.

According to alternative embodiments, the start signal and the completion signal respectively are the time of receiving, by the proxy computer, a request of the original GUI displayed by the client application that has a particular, predefined start position or end position in a known request sequence order. For example, the recording may always start at a particular URL. Said particular URL may correspond e.g. to a URL of a service hosted on the backend server and providing the backend application as a service, whereby said URL may comprise an ID for a particular GUI page and may lack individual parameters and parameter values to be entered in said GUI page and communicated via the URL. In some embodiments, a complete URL comprising a concatenation of the backend application service URL and the parameters (without the parameter values) may be used as the particular URL. Thus, the particular URL may act as an identifier for a particular GUI page contained in the original GUI where a request recording shall start or stop. For example, the original GUI may comprise 10 pages, each page comprising a plurality of data entry fields and a "forward" button for opening the next one of the 10 pages after having completely filled in a current page.

According to embodiments, the alternative GUI is a more lightweight version of the original GUI.

According to embodiments, the alternative GUI comprises a lower number of GUI elements and/or a lower number of pages than the original GUI.

According to embodiments the generation of the alternative GUI that completely or partially implements the part of the workflow represented by the identified request comprises:

identifying, by the proxy computer, a plurality of request sequences stored in the history and covering said part of the workflow, each of said identified request sequences corresponding to a sequence of requests of a user transmitted from the original GUI displayed by said or another client application to the backend application previously, each of the plurality of identified request sequences comprising, for each request, one or more parameter values provided by the user or by the original GUI per default for submission to the backend application;

identifying, by the proxy computer, for each of the parameters in each of the requests of the identified plurality of request sequences, if the parameter is an invariable parameter or a variable parameter, an invariable parameter being a parameter whose value is identical for said request in each of the plurality of identified request sequences, a variable parameter being a parameter of a request whose value differs for said request in two or more of the plurality of identified request sequences; and performing the generation of the GUI by generating a GUI that selectively comprises data entry fields for the variable parameters and that lacks data entry fields for the invariable parameters.

This may be advantageous as a fully automated method for GUI generation and for detection of the "relevant" parameters is provided. Identifying the "variable" parameters, the "relevant" parameters are identified, i.e., parameters whose content cannot reliably be predicted based on the data in the history and, therefore, has to be entered by the user manually. The above features allow to generate an alternative GUI that is smaller and/or that comprises less data entry fields as the original GUI as it comprises only a subset of the parameters and corresponding data entry fields, i.e., those ones whose parameter values could not be predicted reliably due to the variability of the data having been previously entered in respective data entry fields of the original GUI.

According to embodiments, the method further comprises analyzing, by the proxy computer, meta data stored in association with the variable parameters in the history for identifying human-readable labels of the variable parameters; and performing the generation of the GUI such that the data entry fields for the variable parameters are associated with and displayed together with the respectively identified human-readable labels.

For example, the meta data may be specified in HTML or CSS and may be derived by an automated analysis of the original GUI. The meta data may comprise human-readable labels displayed next to the data entry field.

Said features may provide for a very flexible method of generating the alternative GUI, whereby the alternative GUI comprises data entry fields having largely the same labels as the original GUI. The alternative GUI comprises the same labels as the original GUI without the need for human intervention or a manual GUI programming step.

According to embodiments, the submission of each of the one or more current intercepted requests and each of the requests in the request sequences in the history is triggered by a user interacting with a GUI element for indicating completion of entering parameter values in one or more data entry fields in a page of the original GUI.

For example, the submission can be triggered by a user pressing a submit button or selecting a button that opens a new data entry page. In this case, each request corresponds to a GUI page (also referred to as "GUI page" or "window") and a corresponding URL. Each page or URL may correspond to one or more parameters. This embodiment may have the advantage that it can be implemented with standard HTML functionality and that the sequence of entering parameter values in respective fields is irrelevant.

According to embodiments, the submission of each of the one or more current intercepted requests and each of the requests in the request sequences in the history is triggered by a user interacting with a GUI element for indicating completion of entering a single parameter value in a corresponding parameter specific data entry field in a page of the original GUI.

For example, the submission is triggered upon the user having completed entering a value in one text field and then setting the cursor in another text field. This may have the advantage that a more fine granular starting and stopping of requests along a workflow is made possible, because each data entry field (not only each data entry page with a respective URL) triggers a request and may be used as a respective element in the request sequence that is recorded by the proxy computer. However, a comparatively complex GUI, e.g. an AJAX based original GUI is necessary for communicating the movement of the cursor from one field to the next. Moreover, the request sequence is sensitive to the order of parameter values entered by the user in respective fields of the original GUI.

According to embodiments, the client application runs on a client device comprising a display. The backend application runs on a backend server connected via a network to the client device. The method comprises: automatically determining, by the proxy computer, the size of the display of the client device; and selectively generating and providing the alternative GUI instead of the original GUI in case the size of the display of the client device is below a size threshold.

For example, the client device can be a battery-powered mobile hand-held device, e.g. a smartphone or a tablet computer. Alternatively, the client device can be a notebook, a netbook, a desktop computer or a terminal.

According to embodiments, the proxy computer automatically determines if the client device is a mobile device and/or has a display whose size is below a threshold size.

The proxy computer is configured to selectively generate and provide the alternative GUI in case the client device is determined to be a mobile device or is determined to have a display size below the threshold. Otherwise, a new page of the original GUI as requested by the client application is provided, e.g. by forwarding said page that may be generated by the backend application in response to the request of the client application by the proxy computer to the client application.

Said features may be beneficial as the GUI is provided that automatically adapts to the client device type used, thereby saving processing power of mobile, battery powered client device, and/or provides a user with a GUI that can be used more conveniently on a small screen.

According to embodiments, the method further comprises: upon performing the comparison, identifying two or more request sequence candidates that match at least partially with the one or more current intercepted requests and that represent different parts of the workflow implemented by the original GUI; prompting, by the proxy computer, a user of the client application to select one of the request sequence candidates; performing the generation of the alternative GUI, the alternative GUI completely or partially implementing the part of the workflow represented by the selected request sequence candidate.

Said features may be beneficial as a user may be enabled to control which one of two candidate GUIs is generated in case two alternative and equally likely workflow-parts have been identified by evaluating the request sequence history. For example, a user may previously have enrolled 5 employees in a particular course C1 and in a further course C2. In each enrollment, the user may have entered a plurality of parameter values of courses C1 and C2 respectively, e.g. the name of the course leader, place, time, and date, topic, required material etc. Upon the user opening the original GUI of the enrollment program for enrolling a sixth employee in a course, the proxy computer may automatically determine that two "workflows" or "request sequence candidates" exist in the history, one for enrolling a user at course C1 and a second one for enrolling a course in C2. The proxy computer may generate a GUI element that may be presented e.g. in a separate frame of a web page displayed in a browser to enable a user to select one of the request sequence candidates. The two request sequence candidates may differ only in respect to the parameter values entered. For example, a workflow for enrolling a user in course C1 may be identical to the workflow for enrolling a user for course C2 and only the entered parameter values may differ. In other embodiments, the workflow and corresponding request sequence for enrolling a user in course C1 may differ from that of course C2, e.g. because course C1 is a lecture while C2 is a practical tutorial and enrolling in course C2 requires the entry of additional data in an additional text field, e.g. a confirmation that a user is willing to take over costs for chemical substances or another kind of material that are used in the practical course.

Figure 2:
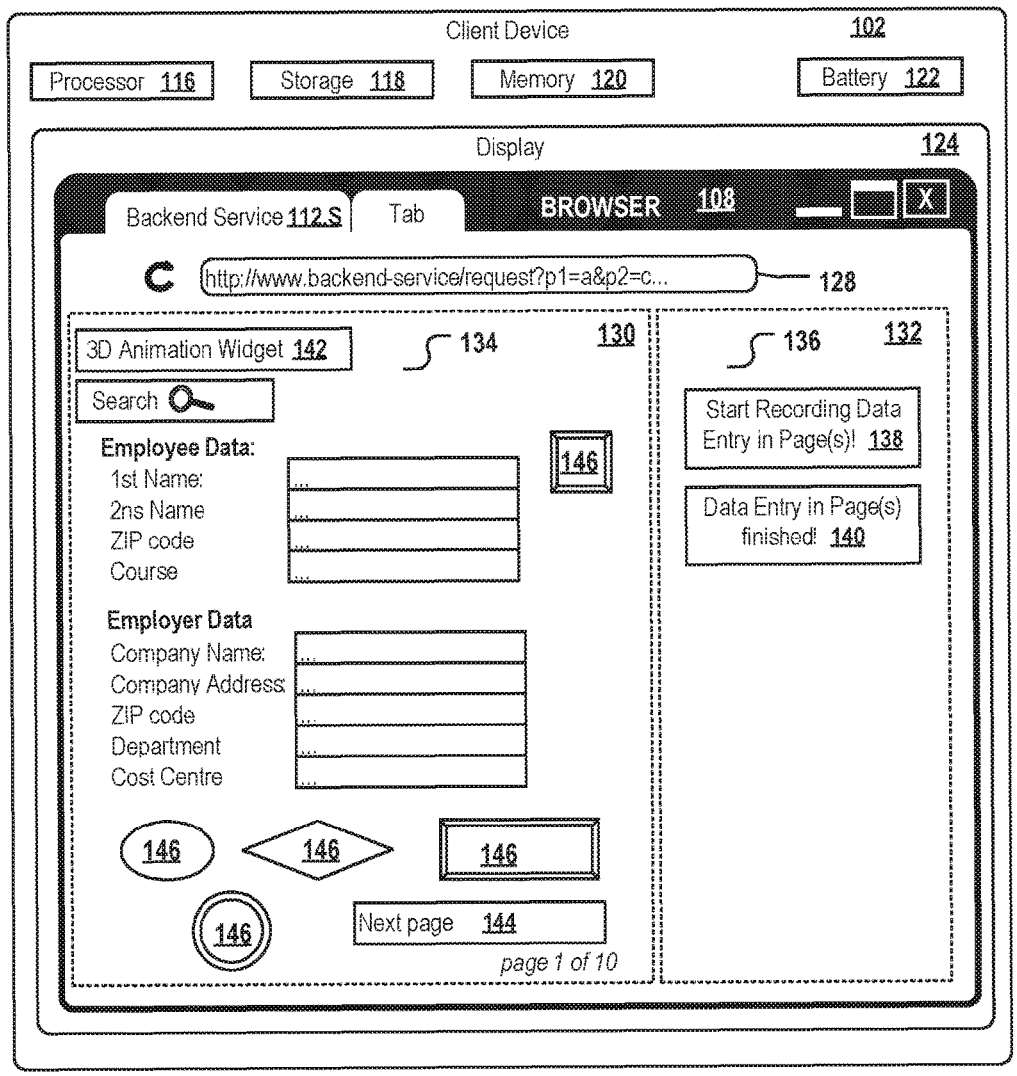
FIG. 2 depicts a client device and an original GUI of a web application.
Figure 3:
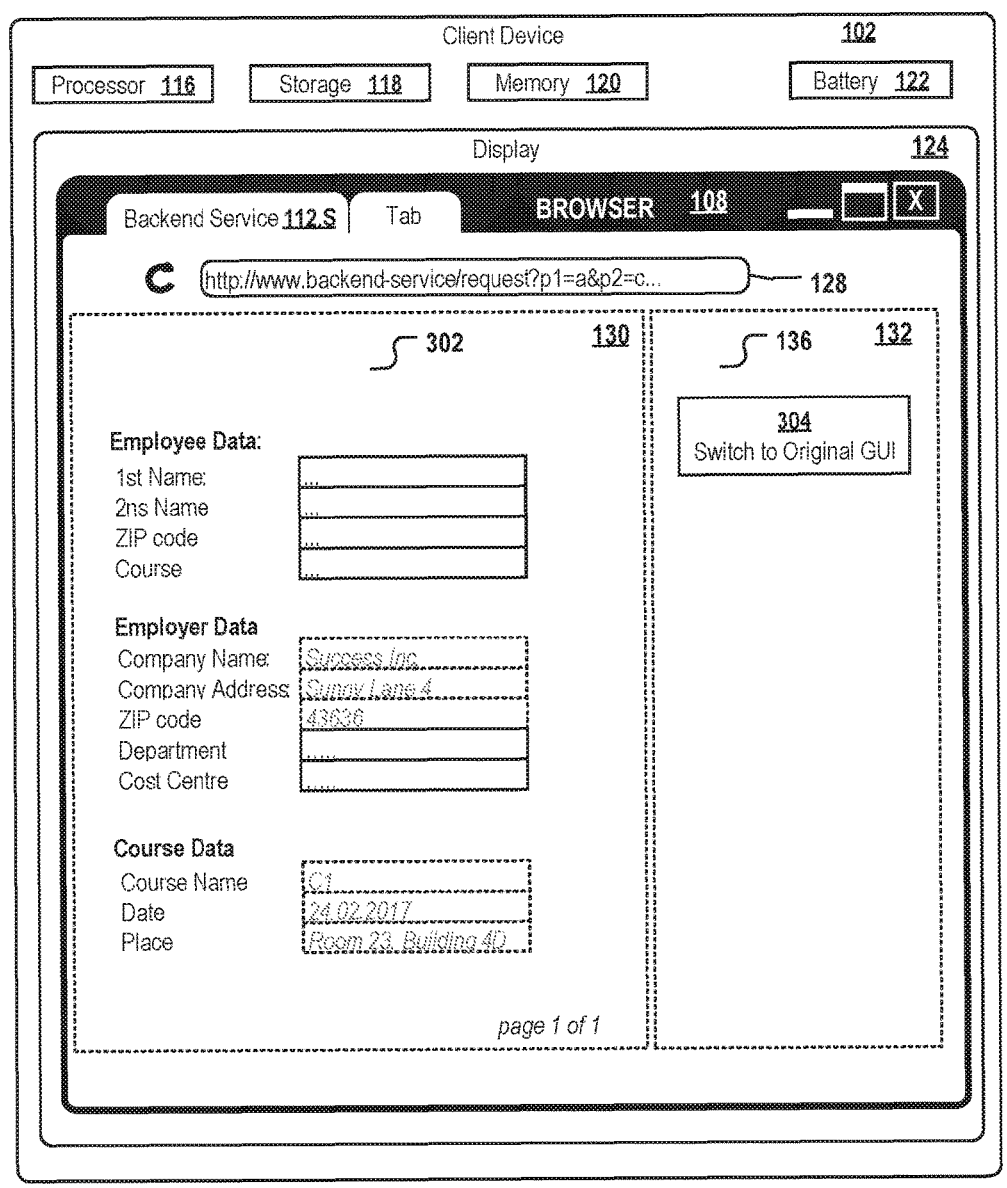
FIG. 3 depicts a client device and an alternative GUI for the web application.

According to the example embodiments depicted in FIGS. 2 and 3, the rich, original GUI 134 comprises 10 pages altogether, whereby the browser frame 130 currently displays a first page comprising a plurality of text fields for entering parameter values related to an employee to be registered and to the employing company. Additional or text fields for entering parameter values of the course for which the employee shall be registered may be contained in one of the following pages 2-10 of the original GUI. A user 101 may fill in pages 1-10 of original GUI 134 multiple times for different employees, whereby the parameter values "company name", "company address" and "ZIP Code" always remain the same while the cost center and department of the employees may vary. Also, the name and address of the employees to be registered varies each time the registration workflow is executed. In an analysis step, selectively those parameters within any one of the pages 1-10 of the original GUI are identified which have assigned different parameter values. For example, the name, ZIP Code and course selected by each employee may have varied in each employee registration process. Also, parameters like the department and cost center of the employer may vary because the employees may relate to different departments and cost centers. However, the name and address of the employing company are identified as invariable parameters having assigned the same parameter values in the order recorded request sequences contained in the history 111. The automatically generated alternative GUI 302 may comprise a single page selectively comprising data and GUI elements for entering parameter values of parameters having been identified as a variable parameter. Alternatively, the alternative GUI may comprise data entry fields also for the invariable parameters (indicated by the dotted border surrounding the respective text fields) but the automatically identified parameter values, e.g. the name and address of the employing company may have automatically been filled into the respective data entry fields, thereby reducing the time and effort necessary for using it for entering data that is assumed to be constant.

For example, a web-based client application may request data from the backend application, percent the received data to a user 101 for review and submit either the same or modified data back to the backend application. The proxy computer may observe HTTP responses served by the backend application for GET requests for identifying parameter values that are likely to be submitted.

For example, a user 101 may need to enroll 20 employees for a class room course. As part of that workflow implemented in an original GUI, the manager has to perform the following steps:

Accessing a learning web-site via the Internet https://learning.company.com

Searching for a class, click "enroll an employee" https://learning.company.com?class=CyberSecurityAwarenessTraining (returns classId=0815)

https://learning.company.com/enroll (returns input form)

Retrieving a list of employees for her department from the HR system in a 2nd browser tab https://hr.company.com https://hr.company.com/departments/C507 (returns a list of employee objects)

Querying employee information for the first entry in the previous list https://hr.company.com/employee/117713 (returns many fields about the employee to be enrolled, including email address)

Back on the learning site's tab in the browser, checking if the employee has already attended the class:

GET https://learning.company.com/learningHistory?employ-eeId=117713&classId=0815 (returns a completion date if the employee has attended the class before)

Picking a date and location for the class and enter the email address of the employee POST https://learning.company.com/enroll?email=bob@company.com&date=2016-01-11&location=Berlin&classid=0815

Repeating steps for other employees:

Learning tab: https://learning.company.com/enroll (returns input form)

HR tab: hit browser back button and get the employee list again https://hr.company.com/departments/C507

HR tab: get details of 2nd employee: https://hr.company.com/employee/0157563 (returns many fields about the user, including email address)

Learning tab: check attendance status: https://learning.company.com/learningHistory?employeeId=0157563&classId=0815

Enter same date and location and new email address on learning tab:

POST https://learning.company.com/enroll?email=paul@company.com&date=201601-11&location=Berlin &classId=0815.

Thus, the proxy computer may derive the parameters and respective values by intercepting GET and POST requests.

A proxy computer as used herein is a dedicated computer system that acts as an intermediary between an endpoint device, such as a client computer, and another endpoint device, e.g. a backend server from which a user or client is requesting a service. The proxy computer may exist on the same machine as a firewall server or it may be on a separate server, which forwards requests through the firewall.

When a proxy server receives a request for an Internet resource (such as a Web page), it looks in its local cache of previously pages. If it finds the page, it returns it to the user without needing to forward the request to the Internet. If the page is not in the cache, the proxy server, acting as a client on behalf of the user, uses one of its own IP addresses to request the page from the server out on the Internet. When the page is returned, the proxy server relates it to the original request and forwards it on to the user. For example, proxy computers can be used to facilitate security, provide administrative control, provide caching services and, according to embodiments of the invention, to provide original and/or alternative GUIs for a client application program. According to some embodiments, the proxy computer enables user privacy and anonymous surfing or for monitoring data traffic and undermining user privacy. Typically, the existence of the proxy computer and its capability to intersect any data exchange between the client application and the backend application is invisible to the user of the client application. Nevertheless, the IP address of the proxy computer is commonly specified as a configuration parameter in the browser and/or another protocol program.

A client computer is a computer that is typically assigned to one or more users. For example, a client computer can be a mobile battery powered hand-held telecommunication device, e.g. a smartphone or a tablet computer, or can be a computer with larger processing power and/or with a screen of a minimum size, e.g. a notebook, a desktop computer or a terminal.

A client application is an application that is interoperable with a backend application, i.e., is capable of exchanging data in a format interpretable by the client and the backend application, the data exchange being executed for interoperably performing a computational task. According to embodiments, the client application, and the backend application are hosted on different computer systems and are configured for exchanging data via a network, e.g. the internet. The proxy computer can be provided as a third, separate computer system. For example, the client application can be hosted on a client device, the backend application can be hosted on a backend server and the proxy computer can constitute a separate computer system, each of said three devices and computer systems connected to each other via a network, e.g. the internet.

According to other embodiments, the proxy computer also hosts the backend application. The proxy functionality may be implemented in a proxy application running on the proxy computer that is configured to intercept any requests submitted by the client application via the network to the backend application. Hosting the proxy and the backend application on the same computer system may have the advantage that the proxy application may be used as a "wrapper" to a legacy-backend application in the same IT environment as the legacy application. This may allow generating an alternative GUI to be provided to one or more clients instead of or in addition to a legacy original GUI without modifying the source code of the legacy backend application.

The client application can be, for example, an HTML-based application whose original GUI is generated completely or partially by a backend server or by a proxy computer intercepting the data exchange between the client and the backend application. The backend application can be, for example, an application provided via a web application server program or an application server program running on a backend server.

A server computer is a computer that is designed to provide services to other computers, e.g. via a network.

A backend application is an application hosted on a computing device, a server, remote to a client device hosting a client application.

A GUI element is a data object some of which's attributes specify the shape, layout and/or behavior of an area displayed on a graphical user interface, e.g. a screen. A GUI element can be a standard GUI element such as a button, a text box, a tab, an icon, a text field, a pane, a check-box item or item group or the like. A GUI element can likewise be an image, an alphanumeric character or any combination thereof. At least some of the properties of the displayed GUI elements depend on the data value aggregated on the group of data object said GUI element represents. A GUI element may represent a parameter and may be adapted to receive data from a user to be assigned to said parameter as a parameter value.

A "lightweight GUI" as used herein is a GUI that is less computationally demanding and/or has a smaller number of GUI elements and/or requires less screen space than a reference GUI, e.g. a standard GUI or an original, legacy GUI of an application. A lightweight GUI may save CPU resources e.g. because it may solely comprise GUI elements whose instantiation is less computationally demanding, is devoid of or comprises only a reduced set of JavaScript code sections, lacks video or audio files and various forms of "flashy" animations or the like.

FIG. 1 depicts a distributed computer system 100 comprising a proxy computer 104. Optionally, the system may, in addition, comprise a client device 102 assigned to a user 101 and hosting a client application 108 and/or may comprise a server computer 106 hosting a backend application 112. The client application may be a special-purpose or standard web browser running on the client device and having instantiated and/or rendered the original GUI. The client application may be interoperable with the backend-application only in a very generic sense, e.g. in that it can exchange HTTP requests and render HTML markup documents provided by the backend application. Alternatively, the client application program may strongly be coupled to the backend application, e.g. in that both applications are developed by the same organization and are configured to exchange requests and responses in a proprietary, non-standard syntax format that may not be interpretable by a standard browser.

The client application may be, for example, an application for enrolling users in courses or for managing the IT infrastructure of an organization. The client application may be configured to send requests 115 via a network 114 and via the proxy computer 104 to the backend-application, whereby the backend application is configured to generate, in response to receiving the request 115, the requested page of the original GUI displayed by the client application and return it to the client application for display, e.g. in a frame of the web browser.

FIG. 2 depicts a client device 102 and an original GUI 130 of a client application 108, e.g. a browser, in greater detail. The client device comprises one or more processors 116, a non-volatile storage device 118, main memory 120, a display 124 and a battery 122. A user 101 of the client device may have entered a service URL of a backend application 112 into the address field 128 of the browser application, e.g. Google Chrome, Firefox or Internet Explorer. The submission of an HTTP request 115 to that URL may trigger the backend application to create and provide the first page of an original GUI 134 via the network 114 to the browser 108. The first page of the original GUI is displayed in a first frame 130 of a browser window. The browser window may comprise a second frame 132 comprising one or more GUI elements generated by a proxy application 110 of the proxy computer 104. The proxy computer 104 is configured to intercept requests 115 that are transferred from the client application 108 to the backend application 112 via the network 114. In response to intercepting a request to the above-mentioned URL being specific for the first page of an original GUI instantiated and displayed by the client application 108, the proxy computer generates one or more additional GUI elements 138, 140 enabling a user 101 to take control over the process of history generation (which will be explained in greater detail later) and/or to switch between displaying the original or an alternative GUI.

The original GUI 134 may be a heavy-weight GUI comprising a plurality of diagrams, images, charts, dynamic widgets, and other elements as indicated by GUI elements 146, 142 in the first page of the original GUI 134.

Once the first page of the original GUI is displayed in the first frame 130 of the browser 108, the user 101 may start entering data into a plurality of fields and other data input GUI elements 146 which are part of the first page of the original GUI. For example, the user may enter the name and address of an employee to be enrolled in a particular course or may perform a sequence of actions in a complex IT system management application in order to check the state of one or more computers and other hardware resources and/or in order to shutdown or restart that computers and hardware resources. By selecting one of the GUI elements of the original GUI, e.g. the next page button 144, the user indicates that he or she has completed the entering of data to be filled into the fields of the first page of the original GUI and triggers the submission a request for loading a second page of the original GUI via the network to the backend application.

Figure 4:
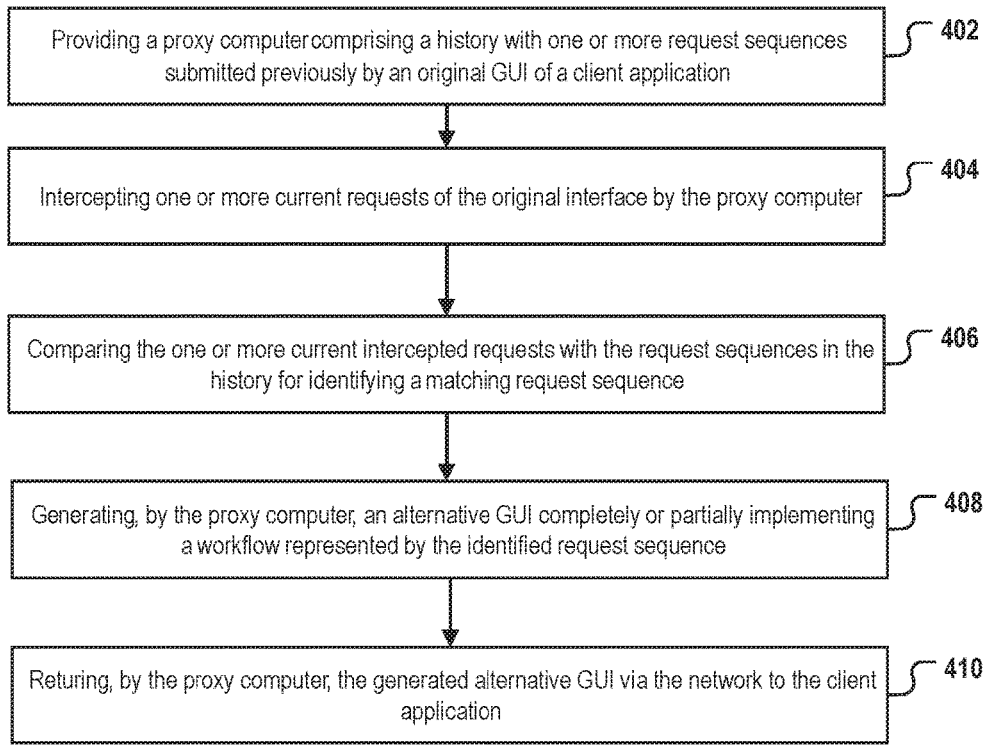
FIG. 4 depicts a proxy-based method for providing an alternative GUI for the web application.

In the following, the operation of the proxy computer and other optional components of the distributed system 100 will be described by making reference to FIG. 4.

The proxy computer 104 provided in step 402 comprises a history 111 with one or more request sequences. Each request sequence in the history represents a sequence of consecutive requests having been transmitted previously from the original GUI displayed by a client application 108 via the proxy computer 104 and via the network 114 to the backend application 112. Each request sequence represents a part of a workflow predefined by the original GUI. For example, a plurality of first ones of the request sequences stored in the history may cover previously submitted requests relating to the entering of data into four out of 10 pages of an original GUI used for enrolling users in a particular course. The first four pages may comprise a data entry fields for entering data of the user to be enrolled. A plurality of second ones of the request sequences stored in the history may cover previously submitted requests relating to the entering of data into the remaining six out of 10 pages of the original GUI. The other six pages may comprise data entry fields for entering data of the course and/or of the course leaders. Thus, the first request sequences may correspond to the first part of a "user enrollment workflow", the second request sequences may correspond to a second part of said workflow.

In step 404, the proxy computer intercepts one or more current requests transmitted from the original GUI 134 displayed by the client application 108 to the backend application 112 via the network and via the proxy computer 104. The current intercepted request can be for example the above-mentioned HTTP request triggered by the user hitting the next page button 144.

In step 406, the proxy computer compares the intercepted one or more current requests with the request sequences that are stored in the history. The comparison is performed in order to identify at least one request sequence in the history that matches completely or at least partially with the one or more current intercepted requests. This, at least, one request sequences also referred to herein as "matching request sequence".

In step 408, the proxy computer evaluates the at least one identified request sequence (matching request sequence) for generating the alternative GUI. The alternative GUI completely or partially implements the part of the workflow represented by the identified request sequence. For example, the history may comprise parameter values and meta-data assigned to respective data entry fields. The meta-data may comprise, for example, field dimensions and/or field labels. The parameter values may comprise the data value is entered by the user in a data entry field representing a particular parameter such as "username" or "ZIP Code". In the evaluation, the proxy computer may automatically identify human readable labels and use said labels as the labels of the GUI elements of the generated alternative GUI. In addition or alternatively, the proxy computer may analyze parameter values of a plurality of request sequences in the history that correspond to the same part of the workflow in order to identify invariable parameters (always or almost always having assigned the same parameter value) and variable parameters (e.g. having assigned two more different parameter values, whereby the occurrence of least two parameter values exceeds a threshold value). The alternative GUI may be generated such that selectively for the variable parameters respective data entry fields are generated. The invariable parameters may not be represented as data entry GUI elements. Rather, the parameter value that is—according to the history—always or almost always assigned to a respective parameter and to a respective data entry field is automatically assigned as a parameter value to said respective parameter in the generated alternative GUI. For example, a "hidden" GUI element is created and the invariable parameter value is assigned to the "hidden" GUI element. Thus, a more condensed GUI layout can be generated that can be more conveniently used on a small screen. Moreover, as the hidden GUI element has already assigned the invariable parameter value having been extracted from the history, the user does not have to enter this parameter value in the alternative GUI.

In step 410, the proxy computer returns the generated alternative GUI 302 (as shown in FIG. 3) via the network to the client application. The client application 108 can display the alternative GUI 302 in frame 130, thereby replacing the original GUI 134 having been previously displayed in this frame. It is also possible, however, that the alternative GUI is displayed in a further frame of the HTML page. By means of the alternative GUI, the user 101 is enabled to perform the parts of the workflow represented by the alternative GUI via the alternative GUI instead of the original GUI.

FIG. 3 displays an alternative GUI 302 having replaced the first page of an original GUI previously presented in the same HTML frame 130 of an HTML page displayed in a client application 108, e.g. a browser. As can be inferred from FIG. 3, the alternative GUI according to the embodiment depicted in FIG. 3 comprises less GUI elements than the original GUI and/or combines GUI elements having been dispersed in the original GUI over a plurality of different pages in a single page of the alternative GUI.

According to some embodiments, in addition to the alternative GUI, the proxy computer generates an additional GUI element 304 that is provided to the client application and may be displayed e.g. on a separate frame 132 in the browser. The additional GUI element 302 may be a button or another selectable element allowing a user to switch between the original and the alternative GUI. For example, in case the user wants to enter a parameter value into a corresponding text field that is hidden in the alternative GUI as it was identified as an invariable parameter, the user may force the system to display the original GUI comprising a respective data entry field by selecting button 304.

Figure 5:
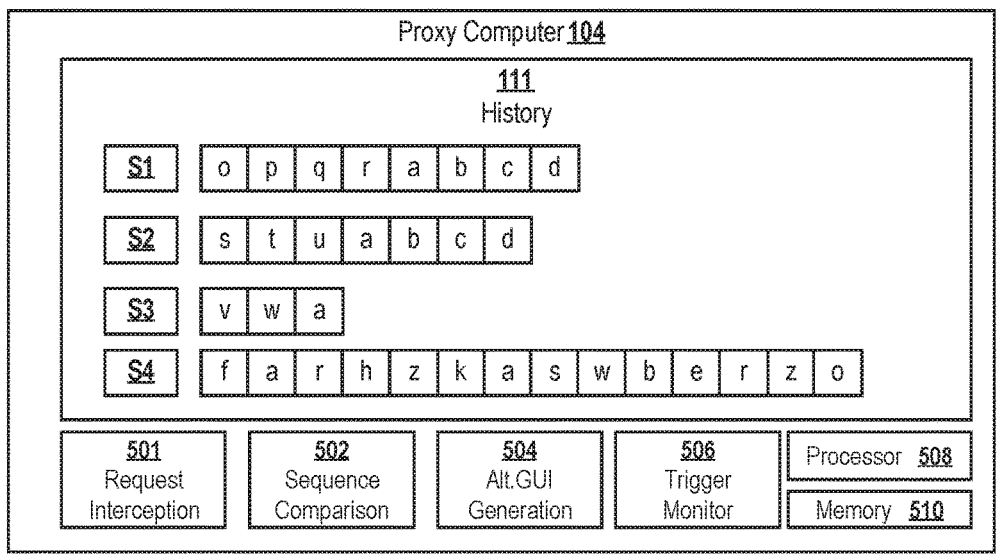
FIG. 5 depicts a proxy computer according to one embodiment in greater detail.

FIG. 5 depicts a proxy computer according to embodiments of the invention in greater detail. The proxy computer comprises one or more processors 508, a main memory 510 and a data storage device comprising a history 111. The history can be implemented for example as a file, a set of files, as a database managed by a database management system or the like. The history comprises a plurality of sequence requests S1-S4 previously transmitted from the client application 108 via the network to the backend application which have been intercepted and stored by the proxy computer. Each request sequence may have the form of a "unity of work" document.

The processor 508 of the proxy computer may execute a proxy application program 110 comprising a plurality of modules 501-506.

The module 501 is configured for intercepting requests received from a defined set of one or more client devices for a defined set of one or more types of client applications.

Module 506 is configured for monitoring the receipt of the trigger signal for starting and stopping the recording of intercepted request sequences for storing recorded request sequences S1-S4 into the history.

The proxy computer stores each request (i.e., an ID of the request, e.g. a corresponding requested URL, some metadata, e.g. data entry field dimensions, layout settings and labels of data entry fields having been filled in by a user before submitting the request, and any parameter values entered by the user in the data entry fields before submitting the request) is stored in the history. A consecutive sequence of requests (up to some predefined maximum number m, e.g. a number between 1 and 50 or up to a timeout signal after a time interval of some minutes since the receipt of the start signal lapsed) is recorded and stored in the history. The start and end of the recording of the request depend on a trigger signal. The trigger signal can be, for example, a timeout, a user action on a GUI element 138, 140 provided by the proxy computer, the receipt of a request relating to a particular ID or URL, or the like. For example, at some point in time, the user 101 may mark the end of a transaction by sending a start signal to the proxy, e.g. by a request to a specific URL or by pressing button 138. The transaction corresponds to a unit of work that is recorded as an individual element of a request sequence S1-S4 in the history. Each request sequence corresponds to a "part of a workflow" within a larger workflow represented by the complete original GUI. Hereby, a "workflow" may be implemented in the form of a strict sequence of steps a user is forced to follow by the architecture of the original GUI. Alternatively, a "workflow" is one path out of potentially many paths a user may freely choose in a complex original GUI.

Upon receiving the start trigger signal, the proxy computer starts recording any requests of the client application that was intercepted by the proxy computer and stores said recorded requests and the associated data in consecutive order in the form of request sequences S1-S4. Upon receiving a completion signal, e.g. upon a user having selected button 140 or having received a timeout signal or a signal that the maximum number of requests was recorded, the proxy computer stops recording further intercepted requests and stores the recorded sequence of requests in the history.

In addition, the proxy computer may automatically and regularly extract parameterized request sequences by analyzing the request sequences in the history. For example, the proxy computer may select each of the stored request sequences S1-S4 and identify for the selected request sequence a plurality of similar request sequences having e.g. a shared subsequence of requests and optionally also identical parameter values assigned to some or all of the requests of the compared sequences. Typically, two sequences that show a sufficiently high degree of similarity are considered as similar request sequences. For example, two request sequences sharing a request sub-sequence that covers more than 80, or more than 90% of the elements (request) of the shorter one of the sequences can be considered as similar request sequences. Alternatively, the proxy computer may compare, upon each request interception, a sequence with the last 1 requests with the request sequences S1-S4 in the history. In case one or more similar request sequences are identified in the history, the proxy computer may prompt a user to name and store this request sequence.

The differences with respect to parameter values of the stored request sequences which have been identified as similar are considered variable parameters and are identified automatically by the proxy computer. User-friendly names for these variable parameters can be taken from HTML field identifiers for generating the alternative GUI selectively comprising data entry fields for the variable parameter values.

According to some embodiments, request sequences are named and stored semi-automatically. The proxy computer may intercept a plurality of consecutive requests of the client application. In case the last m requests in this currently intercepted sequence is similar to a high degree to at least one request sequence in the history regarding the identity, sequence position and optionally also regarding the parameter values, the proxy computer generates a GUI element that prompts the user 101 to name and store the last m steps having been identified as being highly similar to a known request sequence already stored in the history. "Highly similar" may imply that the last m intercepted requests are at least to 90% identical to a request sequence in the history, e.g. comprise an identical sub-sequence that covers 90% of the m elements of the currently intercepted request sequence.

In case a single similar request sequence is identified, the single identified, "matching" request sequence is used for generating the alternative GUI. For example, the single matching request sequence may be associated with some parameter values (e.g. may be or may be linked to a parameterized copy of said request sequence), whereby the associated parameter values are parameter values of parameters identified to be invariable parameters. In case multiple similar request sequences are identified, the proxy computer may prompt a user to select which ones of the candidate request sequences shall be used for creating the alternative GUI. Upon the user selecting one of the suggested candidate request sequences, the proxy computer will identify invariable parameters in a set of previously recorded request sequences being similar to the selected candidate request sequences for identifying variable and invariable parameters. The generated alternative GUI comprises visible data entry GUI elements selectively for those parameters identified as variable.

In some embodiments, the proxy computer generates and transfers a snapshot of the original GUI generated by the proxy or by the backend application in addition to the alternative GUI as to enable the user to verify, for each individual step (corresponding e.g. to a data entry page of a GUI) if the alternative GUI functionally represents the original GUI.

Module 502 is configured for comparing request sequences having previously been recorded and stored in the history with the currently intercepted request of a client application for identifying a matching request sequence in the history that is assumed to represent a particular part of a workflow a user is currently traversing and interaction with an original GUI. Moreover, module 502 or another module of the proxy application is configured to analyze, e.g. on an automated, regular basis, all request sequences S1-S4 stored in the history for identifying sequence requests.

Module 504 is configured to evaluate the identified matching request sequence for generating an alternative GUI that has a smaller or more condensed layout and/or comprises the reduced number of GUI elements. Module may also be configured for identifying a matching parameterized request sequences in which parameters identified as invariable parameters already have assigned parameter values. The created alternative GUI is free of data entry GUI elements for the invariable parameters or merely comprises hidden GUI elements having assigned the invariable parameter value of the matching parameterized request sequence as default value.

In the following, some concrete examples will be described my making references to FIGS. 1-5.

Contrary to web session recording and replay tools such as Rational Function Tester or Tealeaf which analyze user interactions in web sessions for the purpose of function testing or for the analysis of web sessions, embodiments of the invention perform request interception, request sequence history generation for the purposes of providing an alternative GUI for easing user interactions in particular when using a mobile device with a small display. The alternative GUI is provided fully automatically and thus without the need to change the implementation of the original GUI. Thus, the original GUI can still be used and e.g. be selectively presented to a user if the proxy computer determines that the client device hosting the client application is a desktop computer and/or is coupled to a screen whose size exceeds a minimum size threshold value.

In some embodiments, the original GUI is provided by the backend server and the proxy computer merely generates and provides the alternative GUI. In some alternative embodiments, both the original GUI and the alternative GUI are generated and provided by the proxy computer intercepting requests to a backend application. According to embodiments, the proxy computer will return the alternative GUI instead of the original GUI selectively in case the client device is a mobile client device and/or the client device comprises a screen whose size is below a threshold.

According to embodiments, the proxy computer stores each intercepted request (up to some maximum number m) in a history 111. Thus, after a while, the history comprises a plurality of request sequences S1-S4, comprising m or fewer request elements. Each stored request may correspond to a user interaction with the original GUI for indicating completion of a data entry transaction. The number m (or fewer) recorded request is also referred to as recorded request sequence or "suffix". The proxy computer can "replay" each of the stored request sequences and the respectively entered parameter values by creating an alternative GUI comprising invariable-parameter-related first GUI elements being hidden or having assigned invariable parameter values as default values and variable-parameter-related second GUI elements with an empty data entry field. The user selectively enters the still missing variable-parameter values and confirms the replay of the automatically suggested, default parameter values to the proxy computer. The proxy computer then replays the stored request sequence and its parameter values by creating the alternative GUI.

For example, a user registers a group of employees to a team. The employees will differ in their names, but their starting date, employer, membership and permission information will be the same for all of them. Those differences in respect to the values of a particular parameter ("variable parameters", the "names" parameter in this example) between a plurality of requests stored in the history and relating to the same type of request sequence/sub-part of a workflow and/or between at least one stored request sequence in the history and a currently intercepted request can be identified automatically by the proxy computer. User-friendly names for these variables can be taken from HTML field identifiers stored as metadata in the history.

The backend application takes the user via the proxy computer through a sequence of different steps and corresponding requests generated by the original GUI and denoted by different single letters, like o p q r a b c d * s t u a b c d * v w a.

Each letter from left to right stands for a unique URL visited comprising an address of the backend application provided via the network, information about the existing fields (parameters) in the markup received from the URL and parameter values entered by the user 101 and returned to the backend server. The asterisk denotes the moment in the sequence when the user selected the completion control element for an individual request, e.g. presses "next page button" 144 in the original GUI, and when the proxy computer received a trigger signal (e.g. caused by a user selecting button 140) indicating that the recording of a new request sequence shall be terminated and the recorded request sequence stored.

If for example, a maximum number m of 8 steps are stored, the first completion signal received will result in the proxy storing the following sequence of requests S1: o p q r a b c d. While the user continues with requests s t u, no similarity to stored request sequences will be detected, because none of the requests occurs in any stored request sequence S1.

However, when the user then continues with step "a" and a corresponding request "a" of the original GUI currently displayed by the client application is intercepted by the proxy computer, the proxy computer detects that the history comprises a request sequence S1 that contains request a and is followed by request sub-sequence b c d. The proxy computer, therefore, generates a GUI element suggesting the user to automatically continue with the automatically identified request sequence b c d. If the user accepts that, an alternative GUI is generated by the proxy computer, the alternative GUI comprising data entry fields for steps/requests a b c d (second part of S1) that are pre-filled with the same parameter values as stored in the request sequence S1 for the respective requests. The user may change the automatically identified and entered parameter values before submitting a request via the alternative, pre-filled GUI to the backend application. When the user goes through a sequence a b c d for the second time and sends a second completion signal * like in s t u a b c d * and then continues with requests v w a, the proxy computer recognizes that "an" is a request already contained in at least one S1 of the request sequences S1-S4 stored in the history. The proxy computer also recognizes that there are two request sequences S1, S2, both having common successors of a, in particular, S1 comprising a b c d. The parameter values entered by the user in the first occurrence of steps a b c d (i.e., the parameter values stored in association with respective elements of the request sequence S1) can now be compared against the parameter values entered in the second occurrence, i.e., the values entered by the user when generating requests a b c d stored in request sequence S2. Any identical parameter values in requests a b c d in S1 and S2 will be identified as values of an invariable parameter and will be automatically filled into a respective data entry field of the alternative GUI. In some embodiments, the GUI elements representing invariable parameters are hidden. Any parameter in steps a b c d having assigned different parameter values in S1 and S2 are identified by the proxy computer as variable parameters. According to embodiments, the alternative GUI solely comprises GUI date entry elements for entering parameter values for identified variable parameters. So if the user 101 arrives at step a for the next time, the proxy computer will automatically fill in the values of the invariable parameters for generating the requests a b c d, will dynamically create a more lightweight alternative GUI that is at least partially already filled with the values of the invariable parameters and wherein the data entry fields of all parameters in an identified request sequence workflow a user is predicted to traverse may be presented in a single page of the alternative GUI. For example, each of the requests a, b, c and d may correspond to a respective page and corresponding URL requested by the original GUI. The alternative GUI may comprise a single page selectively comprising data entry fields for all variable parameters of all requests a b c d.

Figure 6:
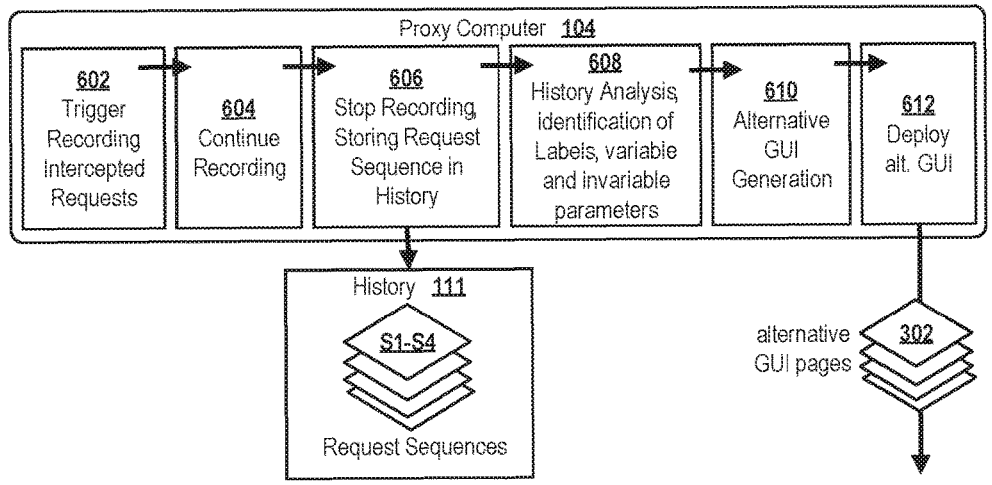
FIG. 6 depicts an overview of several processing steps of the proxy.

FIG. 6 depicts an overview of several processing steps of the proxy having already been described previously in greater detail. In a first step 602, the proxy computer 104 receives a trigger signal for starting recording of one or more requests of an original GUI of a client application to a backend application which are per default intercepted by the proxy computer.

For example, a trigger signal for starting recording of a request sequence can be a user action, e.g. the pressing of a "start recording" button generated by the proxy computer. According to other examples, the recording is started automatically each time a user submits a request via the original GUI, e.g. has completed filling data into a page of an online-form. Thus, each request submissions starts the recording of a respective request sequence and multiple request sequences with different starting events may be recorded in parallel. This may be advantageous as a user is not required to explicitly start the request recording. Rather, request recording is started automatically by the proxy computer system. The user may in some embodiments be enabled to willingly terminate the automated recording of request sequences, e.g. by pressing an end-recording-button provided by the proxy computer.

The proxy computer continuous in step 604 the recording of the intersected requests. For example, once the trigger signal is received, a new file or new data record may be created and stored in the history 111 that is updated and supplemented with additional requests data each time a new request is received and intercepted. Thus, the length of recorded request sequences S1-S4 continuously increases until in step 606 a trigger signal for stopping the recording of the request is received. After having collected and stored to two or more request sequences S1-S4 in the history, the proxy computer in step 608 performs a history analysis, thereby identifying human readable parameter labels and/or variable as well as invariable parameters. Upon receiving and intercepting a new current request, the proxy computer 104 identifies the labels, invariable as well as variable parameters and respective parameter values generated from a set of stored request sequences that is similar to one or more currently received and intercepted requests. It is also possible that the history analysis 608 is executed in response to intercepting the current request for all request sequences being similar to that intercepted current request. The labels, parameters, and parameter values identified in the analysis step 608 are used as input to step 610 for generating an alternative GUI comprising the identified labels and selectively comprising data entry fields for variable parameters. The alternative GUI that may comprise one or more pages and typically comprises fewer pages than the original GUI is deployed in step 612 via the network to the client computer 102.

Figure 7:
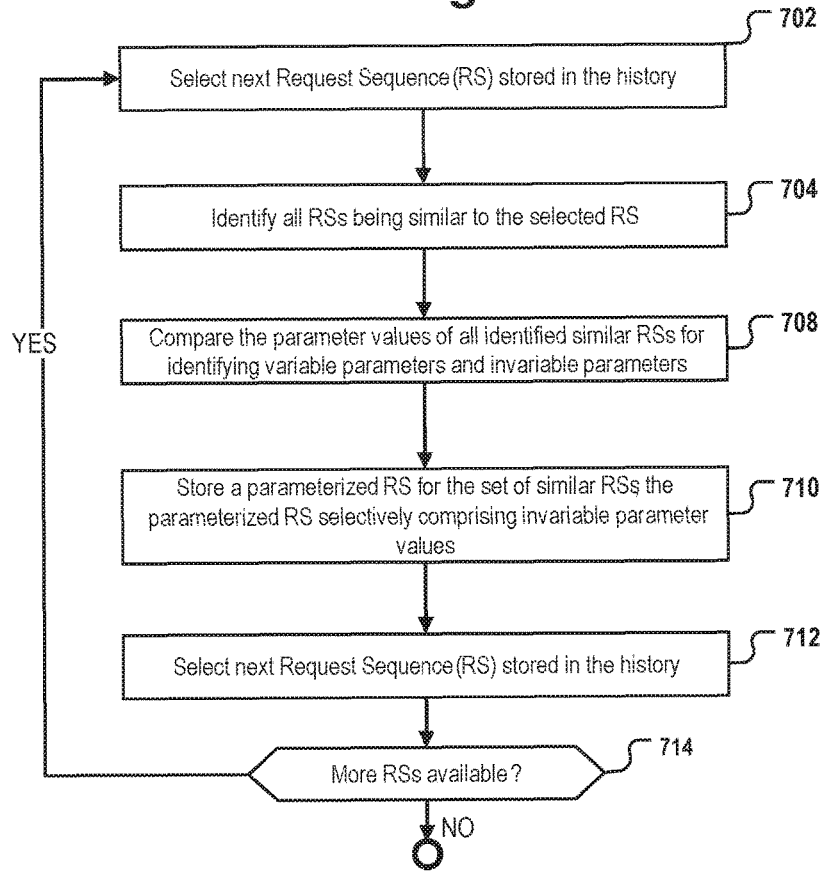
FIG. 7 depicts a workflow for identifying invariable and variable parameters.

FIG. 7 depicts a workflow for identifying invariable and variable parameters that may be executed when performing steps 608 and/or step 406.

At first, one of the request sequences S1-S4 stored in the history is selected in step 702. In step 704, all request sequences stored in the history which are similar to the selected request sequence are identified. The parameter values of respective parameter set of all request sequences identified in step 704 are compared with each other in step 708 in order to identify variable parameters and invariable parameters. In step 710, a kind of "derivative", parameterized request sequence is stored in the history. Alternatively, the individual parameters of all the requests of the request sequences identified as being invariable parameters may be marked as "invariable parameters" and assigned to a respectively extracted, constant parameter value. In step 712, a next request sequence stored in the history may be selected which has not been identified as being similar to the one request sequence selected in step 702. The similarity analysis and parameter type detection may then be repeated for the additional set of similar request sequences until all request sequences have been processed. In some embodiments, the request sequence selected in step 702 is not a request sequence already stored in the history but is a sequence of one or more requests that are currently received and intercepted by the proxy computer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for providing an alternative GUI to a client application, the method comprising:

providing a proxy computer, the proxy computer comprising a history with one or more request sequences, each request sequence being a sequence of consecutive requests having been transmitted previously from an original GUI displayed by said or by another client application via the proxy computer and via a network to a backend application, each request sequence representing a part of a workflow predefined by the original GUI;

intercepting, by the proxy computer, one or more current requests transmitted from the original GUI displayed by the client application to the backend application via the network and via the proxy computer;

comparing, by the proxy computer, the one or more current intercepted requests with the request sequences in the history for identifying a request sequence that matches at least partially with the one or more current intercepted requests;

evaluating, by the proxy computer, the identified request sequence for generating the alternative GUI, the alternative GUI completely or partially implementing the part of the workflow represented by the identified request sequence; and returning, by the proxy computer, the generated alternative GUI via the network to the client application for enabling a user to perform the parts of the workflow represented by the alternative GUI via the alternative GUI instead of the original GUI;

wherein the generation of the alternative GUI that completely or partially implements the part the workflow represented by the identified request includes:

identifying, by the proxy computer, a plurality of request sequences stored in the history and covering said part of the workflow, each of said identified request sequences corresponding to a sequence of requests transmitted by a user via the original GUI from said or the other client application to the backend application previously, each of the identified request sequences comprising, for each request, one or more parameter values provided by the user or by the original GUI per default for submission to the backend application:

identifying, by the proxy computer, for each of the parameters in each of the requests of the identified request sequences, if the parameter is an invariable parameter or a variable parameter, an invariable parameter being a parameter whose value is identical for said request in each of the identified request sequences, a variable parameter being a parameter of a request whose value differs for said request in two or more of the identified request sequences; and performing the generation of the alternative GUI by generating a GUI that selectively comprises data entry fields for the variable a parameters and that lacks data entry fields for the invariable parameters;

wherein the computer-implemented method further includes analyzing, by the proxy computer, meta data stored in association with the variable parameters in the history for identifying human-readable labels of the variable parameters, wherein the generation of the alternative GUI is performed such that the data entry fields for the variable parameters are associated with and displayed together with the respectively identified human-readable labels.

2. The computer-implemented method of claim 1, the client application being a standard or special-purpose browser running on a client device, the method comprising:

transmitting a specification of a layout and function of the original GUI by the backend application to the client application via the network; and instantiating the original GUI in accordance with the transmitted specification by the client application.

3. The computer-implemented method of claim 1, the client application being an application running on a client device, the method further comprising:

reading, by one or more processors of the client device, computer-interpretable instructions which are part of the client application from a storage of the client device; and instantiating the original GUI by executing the read instructions.

4. The computer-implemented method of claim 1, the method comprising generating the history by:

monitoring, by the proxy computer, if a start signal and/or an end signal are received while a user interacts with the original GUI displayed by the client application;

recording, by the proxy computer, each sequence of requests consecutively received from the original GUI displayed by the client application that is delimited by a start signal and a completion signal and storing the request sequence in the history.

5. The computer-implemented method of claim 4, the start signal and the completion signal being signals triggered by a user interacting with a user interface element, the user interface element provided by the proxy computer via a network to a client device hosting the client application; or the start signal being a first request received by the proxy computer after initialization of the client application or after a previous completion signal was received by the proxy computer, the completion signal being a timeout signal after a predefined time interval lapsed since the start signal was received; or the start signal and the completion signal respectively being the time of receiving, by the proxy computer, a request of the original GUI displayed by the client application that has a particular, predefined start position or end position in a known request sequence order.

6. The computer-implemented method of claim 1, the alternative GUI being a more lightweight version of the original GUI.

7. The computer-implemented method of claim 1, the alternative GUI comprising a lower number of GUI elements and/or a lower number of pages than the original GUI.

8. The computer-implemented method of claim 1, submission of each of the one or more current intercepted requests and each of the requests in the request sequences in the history being triggered by a user interacting with a GUI element for indicating completion of entering parameter values in one or more data entry fields in a page of the original GUI.

9. The computer-implemented method of claim 1, submission of each of the one or more current intercepted requests and each of the requests in the request sequences in the history being triggered by a user interacting with a GUI element for indicating completion of entering a single parameter value in a corresponding parameter specific data entry field in a page of the original GUI.

10. The computer-implemented method of claim 1, the client application running on a client device comprising a display, the backend application running on a backend server connected via a network to the client device, the method comprising:

automatically determining, by the proxy computer, a size of the display of the client device; and selectively generating and providing the alternative GUI instead of the original GUI in case the size of the display of the client device is below a size threshold.

11. The computer-implemented method of claim 1, further comprising:

upon performing the comparison, identifying two or more request sequence candidates that match at least partially with the one or more current intercepted requests and that represent different parts of the workflow implemented by the original GUI;

prompting, by the proxy computer, a user of the client application to select one of the request sequence candidates;

performing the generation of the alternative GUI, the alternative GUI completely or partially implementing the part of the workflow represented by the selected request sequence candidate.

12. A computer program product for providing an alternative GUI to a client application, the computer program product comprising a computer readable storage medium having program instructions embodied therewith, the program instructions executable by a processor of a proxy computer to cause the processor to execute a method comprising:

providing a proxy computer, the proxy computer comprising a history with one or more request sequences, each request sequence being a sequence of consecutive requests having been transmitted previously from an original GUI displayed by said or by another client application via the proxy computer and via a network to a backend application, each request sequence representing a part of a workflow predefined by the original GUI;

intercepting, by the proxy computer, one or more current requests transmitted from the original GUI displayed by the client application to the backend application via the network and the proxy computer;

comparing, by the proxy computer, the one or more current intercepted requests with the request sequences in the history for identifying a request sequence that matches at least partially with the one or more current intercepted requests;

evaluating, by the proxy computer, the identified request sequence for generating the alternative GUI, the alternative GUI completely or partially implementing the part of the workflow represented by the identified request sequence; and returning, by the proxy computer, the generated alternative GUI via the network to the client application for enabling a user to perform the parts of the workflow represented by the alternative GUI via the alternative GUI instead of the original GUI;

wherein the generation of the alternative GUI that completely or partially implements the part of the workflow represented by the identified request includes:

identifying, by the proxy computer, a plurality of request sequences stored in the history and covering said part of the workflow, each of said identified request sequences corresponding to a sequence of requests transmitted by a user via the original GUI from said or the other client application to the backend application previously, each of the identified request sequences comprising, for each request, one or more parameter values provided by the user or by the original GUI per default for submission to the backend application;

identifying, by the proxy computer, for each of the parameters in each of the requests of the identified request sequences, if the parameter is an invariable parameter or a variable parameter, an invariable parameter being a parameter whose value is identical for said request in each of the identified request sequences, a variable parameter being a parameter of a request whose value differs for said request in two or more of the identified request sequences: and performing the generation of the alternative GUI by generating a GUI that selectively comprises data entry fields for the variable parameters and that lacks data entry fields for the invariable parameters;

wherein the method further includes analyzing, by the proxy computer, meta data stored in association with the variable parameters in the history for identifying human-readable labels of the variable parameters wherein the generation of the alternative GUI is performed such that the data entry fields for the variable parameters are associated with and displayed together with the respectively identified human-readable.

13. A proxy computer comprising:

a network interface for connecting the proxy computer with a client application via a network;

a storage medium comprising a history with one or more request sequences, each request sequence being a sequence of consecutive requests having been transmitted previously from an original GUI displayed by said or by another client application via the proxy computer and via the network to a backend application, each request sequence representing a part of a workflow predefined by the original GUI;

one or more processors configured for:

intercepting, by the proxy computer, one or more current requests transmitted from the original GUI displayed by the client application to the backend application via the network and the proxy computer;

comparing the one or more current intercepted requests with the request sequences in the history for identifying a request sequence that matches at least partially with the one or more current intercepted requests;

evaluating the identified request sequence for generating an alternative GUI, the alternative GUI completely or partially implementing the part of the workflow represented by the identified request sequence; and returning the generated alternative GUI via the network to the client application for enabling a user to perform the parts of the workflow represented by the alternative GUI via the alternative GUI instead of the original GUI;

wherein the generation of the alternative GUI that completely or partially implements the part of the workflow represented by the identified request includes:

identifying, by the proxy computer, a plurality of request sequences stored in the history and covering said part of the workflow, each of said identified request sequences corresponding to a sequence of requests transmitted by a user via the original GUI from said or the other client application to the backend application previously, each of the identified request sequences comprising, for each request, one or more parameter values provided by the user or by the original GUI per default for submission to the backend application;

identifying, by the proxy computer, for each of the parameters in each of the requests of the identified request sequences, if the parameter is an invarible parameter or a variable parameter, an invariable parameter being a parameter whose value is identical for said request in each of the identified request sequences, a variable parameter being a parameter of a request whose value differs for said request in two or more of the identified request sequences; and performing the generation of the alternative GUI by generating a GUI that selectively comprises data entry fields for the variable parameters and that lacks data entry fields for the invariable parameters;

wherein the one or more processors are further configured for analyzing, by the proxy computer, meta data stored in association with the variable parameters in the history for identifying human-readable labels of the variable parameters, wherein the generation of the alternative GUI is performed such that the data entry fields for the variable parameters are associated with and displayed together with the respectively identified human-readable labels.

* * * * *